US005160503A

United States Patent [19]

Smith

[11] Patent Number: 5,160,503

[45] Date of Patent: Nov. 3, 1992

[54] WATER-SOLUBLE BLENDS OF ACTIVE METHYLENE COMPOUNDS AND POLYHYDRIC ALCOHOLS AS FORMALDEHYDE SCAVENGERS

[75] Inventor: Richard D. Smith, Opelika, Ala.

[73] Assignee: West Point Pepperell, West Point, Ga.

[21] Appl. No.: 436,142

[22] Filed: Nov. 13, 1989

[51] Int. Cl.[5] ......................... B27N 3/02; C09K 3/00; D06M 13/382; D06M 13/417; D06M 23/04

[52] U.S. Cl. ......................................... 8/115.7; 8/182; 8/183; 8/184; 8/185; 8/186; 8/187; 8/116.4; 252/8.8; 252/182.24; 252/182.28; 252/182.29; 252/184; 264/109; 428/528

[58] Field of Search ................ 8/115.7, 182, 183, 184, 8/185, 186, 187, 116.4; 252/8.8, 182.29, 184; 264/109; 428/528

[56] References Cited

PUBLICATIONS

Tomasino et al., *Textile Chemist and Colorist,* vol. 16(12), pp. 33-38, Dec., 1984.

*Primary Examiner*—James C. Cannon

*Attorney, Agent, or Firm*—Pennie & Edmonds

[57] ABSTRACT

A composition for a formaldehyde scavenger is provided which consists of a water-soluble blend of a substituted or unsubstituted polyhydric alcohol and an active methylene compound selected from the group consisting of dialkyl malonate and alkylacetoacetate.

35 Claims, No Drawings

WATER-SOLUBLE BLENDS OF ACTIVE METHYLENE COMPOUNDS AND POLYHYDRIC ALCOHOLS AS FORMALDEHYDE SCAVENGERS

BACKGROUND OF THE INVENTION

1. Technical Field

The present invention relates to compositions useful for reducing the amount of formaldehyde released, for example, from durable press treated fabrics and during the manufacture of particleboard. More particularly, the present invention relates to compositions useful as formaldehyde scavengers which are uniquely effective in reducing the amount of formaldehyde released from durable press treated fabrics and during the manufacture of particleboard, and subsequently without detracting from the properties of the fabrics or the particleboard.

The term "fabric" as used herein means products and objects made from natural textile fabrics such as jute, sisal, ramie, hemp, and cotton as well as many of the synthetic organic fibers, such as rayon, cellulose esters, vinyl resin fibers, polyacrylonitrile and copolymers thereof, polymers and copolymers of olefins such as ethylene, polyimide or nylon types, and the like. The fabrics used can be those of a single composition or a mixture of fibers.

The term "durable press treated fabric" as used herein means fabrics as described above which have been imparted with crease and wrinkle resisting properties under both wet and dry conditions by heating, drying, and curing with a finishing agent such as glyoxal resin, formalin, ureaformaldehyde resin, dimethylolurea, dimethyl ether of ureaformaldehyde, melamine formaldehyde resins, cyclic ethylene urea formaldehyde resins, e.g. dimethylol urea, triazine-formaldehyde resins, triazone formaldehyde resins and the like which are well known in the art and need not be described in detail here.

The term "particleboard" as used herein means an article used in construction of buildings. It is manufactured by compressing sawdust mixed with a resin and heating to cure the resin. The resin is normally a formaldehyde resin.

2. Description of Background Art

The uses of formaldehyde and formaldehyde-derived products have been fundamental in the modernization of chemical finishes in the textile industry and for the dry process manufacturing technique in the particleboard industry. Associated with the use of these products, however, is the formation of free or releasable formaldehyde in finished fabrics or garments and during the heating cycle of the manufacture of particleboard, especially if the finished board is exposed to heat and/or humidity.

The released formaldehyde is severely irritating to the eyes, mucous membranes and skin. It is toxic if ingested and has been reported as a suspect human carcinogen with prolonged exposure of vapor at high concentrations. Accordingly, there has been increasing pressure by environmental consumer and labor groups to minimize the amount of formaldehyde released for example, from chemically treated fabrics or particleboards. The federal Occupational Safety and Health Administration ("OSHA") currently is considering proposals that call for limits as low as 0.1 to 0.5 ppm of formaldehyde in the atmosphere at the workplace. Current acceptable formaldehyde emission levels for particleboard are found in the Federal Register, 24 C.F.R., Part 3280, using the Large Chamber Test Method FTM-2 with an upper limit of 0.3 ppm.

Chemical finishing procedures using formaldehyde and formaldehyde derived products are performed principally on those fabrics which are composed either entirely or in part of cellulosic fibers, i.e., cotton and rayon. These fibers have chemically reactive sites (hydroxyl groups) which lend themselves to chemical modification and treatments. Of particular importance in this regard is the treatment of rayon and cotton containing fabrics with difunctional reagents which are capable of chemically cross-linking the cellulose chains comprising the fibers. Such reactions improve fiber resilience, thereby enhancing wrinkle resistance and recovery, as well as imparting durable press characteristics to the treated fabrics.

Modern durable press finishing processes follow very closely the original TBL (Tootal, Broadhurst, Lee) process based on water-soluble methylolurea. The fabrics to be treated are padded, foam finished or otherwise impregnated in a continuous manner with a solution of finishing chemicals containing a formaldehyde-derived cross linking agent and a curing catalyst. The finishing composition ordinarily contains additional compositions such as weight builders and hand modifiers. e.g., softening agents and stiffening agents. Following impregnation, the fabrics are frame dried to fixed dimensions and cured at elevated temperatures. Fabrics finished in this manner are said to possess a memory. For example, a fabric cross-linked in the flat, dry state will return to that state after washing when it is given an opportunity to shed its wrinkles in a tumble dryer.

A urea-glyoxal formaldehyde adduct, 1,3-dimethylol-4,5-dihydroxyethyleneurea (DMDHEU), has been the primary cross-linking agent in use in the United States since enthusiastic customer acceptance of permanent press products in 1965 prompted a shift from the use of the cyclic ureas, i.e. alkyleneureas, urons and triazones, to a cross-linking system which is lower in formaldehyde release and more resistant to hydrolysis. DMDHEU, a N-methylol cross-linking agent, represents at present the optimum cross-linking agent for fabrics which are composed either entirely or in part of cellulose fibers. The cross-linking reaction of DMDHEU with cellulose is believed to occur principally through the reaction of the pendant DMDHEU N-methylol groups with the hydroxyl groups of the cellulose.

Prior to 1965, it was not unusual for unwashed finished products to release 3,000–5,000 ppm formaldehyde when tested by the AATCC Test Method 112-1978 (Sealed Jar Method). The Sealed Jar Method measures formaldehyde release as a vapor from a fabric stored over water in a sealed jar for 20 hours at 49° C. or 4 hours at 65° C. A reduction in the release of formaldehyde to 2,000 ppm and later 1,000 ppm, was achieved largely through the introduction of DMDHEU as the primary cross-linking agent in durable press finishing processes.

The amount of formaldehyde released as a vapor from a fabric under ambient air conditions (temperature: 23° C.±1°, relative humidity 55%±2%) can also be measured by the dynamics chamber test method. (Roberts, Eugene C. and Rossano, Anthony J. Jr., *AATCC*; Vol. 16, No. 3, p. 29 (1984).

The modification or alkylation of DMDHEU through the addition of one or more polyhydric alcohols, such as diethylene glycol and sorbitol, to the finishing composition is known to further reduce the amount of formaldehyde released by durable press treated fabrics. Capping of pendant DMDHEU N-methylol groups by the polyhydric alcohols prevents the formation of free formaldehyde in the finishing composition and may reduce formaldehyde release by as much as 50%. Nevertheless, the amount of formaldehyde released from fabrics treated with modified or alkylated DMDHEU remains higher than is acceptable to environmental, consumer and labor groups. Furthermore, in the chemical treatment of fabrics, DMDHEU is generally not the sole source of free formaldehyde. Ordinarily, dyeing and finishing chemical requirements are such that supplemental formaldehyde or formaldehyde-derived chemicals such as dye fixatives, hand modifiers, etc., account for a formaldehyde release which can be substantially higher than that obtained from a simple durable press finishing composition consisting solely of a cross-linking agent and a catalyst.

The incorporation of a formaldehyde scavenger for example, into durable press finishing compositions and the urea formaldehyde resin is known to reduce the amount of formaldehyde released from durable press treated fabrics and from particleboard respectively. The formaldehyde scavengers reportedly react by two mechanisms. In one mechanism the formaldehyde scavenger may react with free formaldehyde in the finishing composition or the urea-formaldehyde resin to form a stable addition compound at the curing temperature. Alternatively, the formaldehyde scavenger may prevent the formation of free formaldehyde in the finishing composition by capping pendant DMDHEU N-methylol groups and free N- methylol groups produced by the hydrolysis of the cross link.

An effective formaldehyde scavenger useful in the finishing composition must be water-soluble and able to penetrate the fiber at the reaction site. In addition, an effective formaldehyde must be nonvolatile under curing conditions and compatible with the chemicals of the finishing composition or the urea-formaldehyde resin composition. It must not be so basic as to inactivate the catalyst and promote hydrolysis of the N methylol groups to N-H and formaldehyde. At the same time, it must not be so acidic as to hydrolyze the cross link during the sealed jar test. A formaldehyde scavenger must not adversely affect fabric properties such as hand, shrinkage, mullins burst and shade or whiteness or the mechanical properties of the particleboard. And, of course, it must be economical to use in production and efficient at reasonable levels such as 1-3% solids on the weight of the bath ("owb").

Heretofore, the prior art has not disclosed a formaldehyde scavenger, suitable for use in the durable press treatment of fabrics or in the maintenance of particleboard, which is effective in reducing released formaldehyde to the low levels which are currently desired without detrimental effects on fabrics or particleboard properties. Currently, the formaldehyde scavengers most widely used in durable press finishing compositions are polyhydric alcohols, such as diethylene glycol and sorbitol and in the manufacture of particleboard are nitrogen containing compounds such as urea, melamine, diazine, triazine and amine compounds (U.S. Pat. No. 4,559,097). Compounds such as these, however, are not sufficiently effective in reducing formaldehyde levels to produce the low levels which are currently desired.

Nitrogenous compounds such as urea, ethyleneurea and, in particular, carbohydrazide are known to effectively reduce formaldehyde levels but only at the expense of the properties of the fabrics. Residual amide (—CONH) groups in the treated fabrics cause chlorine retention and possible fabric yellowing as well as a reduction in the lightfastness of certain azo dyes. These side effects preclude the wide use of nitrogenous compounds as formaldehyde scavengers in durable press finishing processes. Further the nitrogenous compounds and the resin components of the urea-formaldehyde resin composition may react, decreasing the strength of the particleboard. These side effects preclude the wide use of nitrogenous compounds as formaldehyde scavengers in particle board.

Dimethyl-1,3-acetonedicarboxylate, diethyl malonate and ethylacetoacetate, three active methylene compounds, have been suggested by Tomasino et al, in *Textile Chemist and Colorist*, Vol. 16, No. 12, Dec. 1985, as possible formaldehyde scavengers, with dimethyl-1,3-acetonedicarboxylate being particularly effective in reducing formaldehyde release under laboratory conditions. In laboratory tests, these compounds are found to be effective in reducing the amount of formaldehyde released by fabrics treated with a durable press finishing composition comprising DMDHEU, without detrimental effects on fabric, properties. These compounds, however, are insoluble in water or of low solubility and therefore are not suitable for use in present durable press finishing processes.

SUMMARY OF THE INVENTION

Accordingly, it is an object of the present invention to provide a novel composition for a formaldehyde scavenger which effectively increases the solubility of active methylene compounds so as to allow their use in durable press finishing processes.

It is another object of the present invention to provide a novel composition for a formaldehyde scavenger which is effective in reducing the amount of formaldehyde released for example, from durable press treated fabrics without detracting from the properties of the fabrics and from particleboard without detracting from the mechanical properties of the particleboard.

It is yet another object of the present invention to provide a method of reducing the amount of formaldehyde released for example, from durable press treated fabrics without detracting from the properties of the fabrics and from particleboard without detracting from the mechanical properties of the particleboard.

These and other objects of the invention, as well as a fuller understanding of the advantage thereof can be had by reference to the following description and claims.

The foregoing objects are achieved according to the present invention by mixing an active methylene compound selected from the group consisting of dialkyl malonate and alkylacetoacetate under anhydrous conditions with substituted or unsubstituted polyhydric alcohols. The compounds are identical to the reactants disclosed in U.S. application Ser. No. 186,304, now abandoned. However, instead of transesterifying the dialkyl malonate (or alkylacetoacetate) with polyhydric alcohols to form a product which is the formaldehyde scavenger as disclosed in U.S. application Ser. No. 186,304, I have unexpectedly found that the initial reactant mixtures form blends which are themselves effective formaldehyde scavengers giving essentially the same formaldehyde odor reduction as does the transesterified reacted product. The advantage of the present invention is the elimination of the transesterification reaction step altogether with its concomitant need for a transestification acid catalyst and heating of the solution. An additional advantage is that, while dialkyl malonates are known to be of low solubility in water and therefore by themselves not suitable formaldehyde scavengers, the blend of the dialkyl malonate and diethylene glycol significantly increases dialkyl malonate solubility. Such malonate/glycol blends thereby allow both the dialkyl malonates and diethylene glycol to serve as formaldehyde scavengers simultaneously.

Furthermore, in durable press finishing applications, diethylene glycol alone is known to interfere with the reaction of the cross-linking agent and the cellulose fibers at concentrations ≧ about 2%. This adversely affects durable press and other important fabric properties such as hand, shrinkage, mullins burst and shade or whiteness. The interference apparently results from the reaction of the diethylene glycol with the cross-linking agent which competes with the preferred reaction of the cross-linking agent with the cellulose fibers. The formation of dialkyl malonate/diethylene glycol and alkylacetoacetate/diethylene glycol blends thus allow the concentration of diethylene glycol to be kept at a minimum for effective formaldehyde reduction without adversely affecting desirable fabric properties.

The reactant mixture solution of the present invention may be used in a manner analogous to known formaldehyde scavengers. For example, the solution may be incorporated into a durable press finishing composition comprising an N-methyol cross-linking system, such as DMDHEM or modified DMDHEM.

A fabric composed either entirely or in part of cellulose fibers may be padded, foam finished or otherwise impregnated with the durable press finishing composition.

When padding a fabric with the durable press finishing composition, the finishing composition is composed as follows:

TABLE I

| Components | Percent Solids owb | Preferred |
|---|---|---|
| DMDHEU | 3-10 | 8 |
| Catalyst | 0.5-3 | 1.6 |
| Diethylene glycol | 1-5 | 1.3 |
| Ethoxylated wetting agent | .05-.5 | .1 |
| dialkyl malonate | .25-2 | .7 |

When foam finishing a fabric with the durable press finishing composition, the foam solution is highly concentrated and the concentration of each component of the solution increases proportionally. For example, the concentration of each component may be double that of each component of a padding solution, in which case, the water-soluble blend of diethylene glycol and dialkyl malonate is incorporated into the finishing composition in an amount ranging from 1 to 3% solids owb for compounds such as diethyl malonate and 1 to 3% solid owb for compounds such as dimethyl malonate. Subsequent to treatment with the finishing composition, the fabric is dried and cured according to the usual manner.

In another example, the active methylene compound may be added directly to the urea-formaldehyde resin used in the manufacture of particleboard or diluted with water and sprayed on the surface of the board before it is pressed. The amount of scavenger applied or added depends on the nature of the resin added to the particleboard and the curing conditions. However, the correct amount for any particular case may be determined by testing various amounts of scavenger and evaluating the amount of formaldehyde released by the board.

The water-soluble active methylene compounds of the present invention are uniquely effective in reducing the amount of formaldehyde released for example from fabrics treated with a durable press finishing composition comprising. For example, an N-methylol cross linking agent, such as DMDHEU or modified DMDHEU and from the urea-formaldehyde resin comprising the particleboard. Free formaldehyde in such a finishing composition or in the formaldehyde resin reacts with the active methylene group of the formaldehyde scavenger to form a stable addition compound under curing conditions, such as diethyl malonate or ethyl acetoacetate. The amount of formaldehyde released form fabrics treated with a durable press finishing composition prepared according to the present invention or during the manufacture of particleboard in which the urea-formaldehyde resin is treated with the compound of the present invention are reduced to low levels. The levels of formaldehyde are reduced to below 100 ppm without detrimental effects on fabric properties such as hand, shrinkage, mullins burst and shade or whiteness in fabric applications and a significant percentage of the original level in particleboard applications without detrimental effects on the strength of the particleboard due to the influence on the adhesive and/or inactivation of the formaldehyde catalyst respectively.

Further, the water soluble blend of the present invention may be used in the production of fiberboard and other fibrous articles, such as hardboard and insulation board; chipboard; plywood; oriented strand board; and waferboard.

DESCRIPTION OF THE PREFERRED EMBODIMENTS

The following nonlimiting examples are intended to illustrate the compositions, methods and products of the invention and the advantages thereof.

EXAMPLE 1

In the following procedure, a durable press finishing composition comprising a water-soluble blend of dimethyl malonate and diethylene glycol is prepared.

A mixture is prepared by adding dimethyl malonate to diethylene glycol in the proportion of 36.2 weight percent of dimethyl malonate to 63.8 weight percent of diethylene glycol. The mixture is stirred at room temperature until the dimethyl malonate is fully in solution and the blend is clear liquid.

The blend is then added to a durable press finishing composition to form final compositions of:

| | Weight Percent | |
|---|---|---|
| | Composition A | Composition B |
| 40% DMDHEU | 12 | 12 |
| Acidified magnesium chloride catalyst | 2.4 | 2.4 |
| Ethoxylated wetting agent | 1.0 | 1.0 |
| Dimethyl malonate/diethylene glycol blend | 1.0 | 2.0 |

These final compositions can be applied to fabrics composed either entirely or in part of cellulose fibers.

EXAMPLE 2

In the following procedure, a durable press finishing composition comprising a water-soluble blend of diethyl malonate and diethylene glycol is prepared.

Diethyl malonate is added to diethylene glycol in the proportion of 36.2 weight percent of diethyl malonate to 63.8 weight percent of diethylene glycol. The mixture is stirred at room temperature until the dimethyl malonate is fully in solution and the blend is a clear liquid.

The blend is then added to a durable press finishing composition to form a final composition of:

| | Weight Percent Composition C |
|---|---|
| 40% DMDHEU | 12 |
| Acidified magnesium chloride catalyst | 2.4 |
| Ethoxylated wetting agent | 1.0 |
| Diethyl malonate/diethylene glycol blend | 2.0 |

This final composition can be applied to fabrics composed either entirely or in part of cellulose fibers.

EXAMPLE 3

A series of experiments, using 50%/50% polycotton sheeting, 50% polyeser and 50% cotton fiber blend, are carried out in order to determine the effectiveness of the malonate/diethylene glycol blend in reducing the amount of formaldehyde released from fabrics treated with durable press finishing compositions comprising DMDHEU.

The polycotton sheeting is padded with the durable press composition A-C of Example 1 and 2. Polycotton sheeting padded with a durable press composition without the malonate/diethylene glycol blend is used as the control fabric. The results are also compared with a series of comparative experiments in which the polycotton sheeting is treated with a durable press composition comprising DMDHEU and bis(2-hydroxyethoxyethyl) malonate (DHM), the transesterification product of the diethyl- or dimethyl-malonate and diethylene glycol. The synthesis and use of such transesterification product are disclosed in U.S. patent application Ser. No. 186,304. The sheets are dried end cured at 350° F. for 1.5 minutes. The cured samples are submitted for testing according to the AATCC Test Method 112-1984. The test results are summarized in Table I.

TABLE 1

| Lab. Trial | Formaldehyde Scavenger Wgt % in Final Durable Press Composition | Durable Press Comp. | Released Formaldehyde ppm | Released Formal-dehyde Reduc. |
|---|---|---|---|---|
| 1 | 0 (control) | | 425 | — |
| | 2 DHM | | 250 | 41 |
| | 2 DMM/DEG | B | 238 | 44 |
| | 2 DEM/DEG | C | 263 | 38 |
| 2 | 0 (control) | | 375 | — |
| | 2 DHM | | 213 | 43 |
| | 2 DMM/DEG | B | 325 | 13 |
| | 2 DEM/DEG | C | 263 | 30 |
| 3 | 0 (control | | 225 | — |
| | 1 DHM | | 163 | 28 |
| | 1 DMM/DEG | A | 175 | 22 |
| 4 | 0 (control) | | 500 | — |

TABLE 1-continued

| Lab. Trial | Formaldehyde Scavenger Wgt % in Final Durable Press Composition | Durable Press Comp. | Released Formaldehyde ppm | Released Formal-dehyde Reduc. |
|---|---|---|---|---|
| | 2 DHM | | 263 | 47 |
| | 2 DMM/DEG | B | 263 | 47 |
| 5 | 0 (control) | | 438 | — |
| | 2 DHM | | 238 | 46 |
| | 2 DMM/DEG | B | 300 | 32 |
| | 2 DEM/DEG | C | 250 | 43 |
| 6 | 0 (control) | | 425 | — |
| | 2 DHM | | 250 | 41 |
| | 2 DMM/DEG | B | 238 | 44 |
| | 2 DEM/DEG | C | 263 | 38 |
| 7 | 0 (control) | | 375 | — |
| | 2 DHM | | 213 | 43 |
| | 2 DMM/DEG | B | 325 | 13 |
| | 2 DEM/DEG | C | 263 | 30 |

where
DHM is bis (2-hydroxethoxyethyl) malonate
DMM is dimethyl malonate
DEM is diethyl malonate
DEG is diethylene glycol

EXAMPLE 4

In the following procedure, a durable press finishing composition comprising a modified DMDHEU and a water soluble blend of dimethyl malonate and diethylene glycol is prepared.

Dimethyl malonate is added to diethylene glycol in the proportion of 36.2 weight percent of dimethyl malonate to 63.8 weight percent of diethylene glycol. The mixture is stirred at room temperature until the dimethyl malonate is fully in solution and the blend is a clear liquid.

The blend is then added to a durable press finishing composition to from final compositions of:

| | |
|---|---|
| | Composition D |
| 40% diethylene glycol capped DMDHEU | 12 |
| Acidified magnesium chloride catalyst | 2.4 |
| Ethoxylated wetting agent | 1.0 |
| Diethyl malonate/diethylene glycol blend | 2.0 |
| | Composition E |
| 45% methyl alcohol capped DMDHEU | 12 |
| Acidified magnesium chloride catalyst | 2.4 |
| Ethoxylated wetting agent | 1.0 |
| Dimethyl malonate/diethylene glycol blend | 2.0 |

EXAMPLE 5

A series of additional experiments were performed to test the formaldehyde scavenging effectiveness of the dimethyl malonate/diethylene glycol blend in durable press finishing compositions comprising chemically modified DMDHEU, i.e., diethylene glycol capped and methyl alcohol capped DMDHEU. 50%/50% polycotton sheeting is padded with the durable press compositions D and E of Example 4. Polycotton sheeting padded with a durable press composition without the dimethyl malonate/diethylene glycol blend is used as the control fabric. The results are also compared with a series of comparative experiments in which the polycotton sheeting is treated with a durable press composition comprising the modified DMDHEU and the transesterification product of the dialkyl malonate and diethylene glycol. The synthesis and use of such trans-esterification product are disclosed in U.S. patent application Ser. No. 186,304.

The sheets are dried and cured at 350° F. for 1.5 minutes. The cured samples are submitted for testing according to the AATCC Test Method 112-1984. The test results are summarized in Table II.

TABLE II

| Lab. Trial | Formaldehyde Scavenger Wgt % in Final Durable Press Composition | Durable Press Comp. | Released Formaldehyde ppm | Released Formaldehyde Reduc. |
|---|---|---|---|---|
| 1 | 0 (control) | D | 125 | |
| | 2 DHM | D | 75 | 40 |
| | 2 DMM/DEG | D | 75 | 40 |
| 2 | 0 (control) | E | 138 | |
| | 2 DHM | E | 88 | 36 |
| | 2 DMM/DEG | E | 88 | 36 |

The foregoing examples are intended to illustrate, without limitation, the compositions of water-soluble malonate/diethylene glycol blends as formaldehyde scavengers of the present invention, their preparation, and use thereof in reducing the amount of formaldehyde release from fabrics and from particleboard without detracting from the properties of the fabrics or the particleboard. It is understood that changes and variations can be made therein without departing from the scope of the invention as defined in the following claims.

What is claimed is:

1. A composition for a formaldehyde scavenger consisting of a water-soluble blend of a substituted or unsubstituted polyhydric alcohol and an active methylene compound selected from the group consisting of dialkylmalonate and alkylacetoacetate.

2. A method for the preparation of a formaldehyde scavenger according to claim 1 comprising the steps of:

a) mixing together, under anhydrous conditions, a substituted or unsubstituted polyhydric alcohol and an active methylene compound selected from the group consisting of dialkylmalonate and alkylacetoacetate; and b) stirring the mixture of a) to obtain a water-soluble blend which is an effective formaldehyde scavenger.

3. The method according to claim 2, wherein the active methylene compound and the substituted or unsubstituted polyhydric alcohol are mixed in a ratio of 1 mole active methylene compound: 2.2 moles substituted or unsubstituted polyhydric alcohol.

4. The method according to claim 2, wherein the active methylene compound is diethyl malonate.

5. The method according to claim 2, wherein the active methylene compound is dimethyl malonate.

6. The method according to claim 2, wherein the active methylene compound is ethylacetoacetate.

7. The method according to claim 2, wherein the substituted or unsubstituted polyhydric alcohol is diethylene glycol.

8. A method of reducing the amount of formaldehyde released from a fabric composed either entirely or in part of cellulosic fibers, wherein said fabric is treated with a durable press finishing composition comprising a water-soluble blend of a substituted or unsubstituted polyhydric alcohol and an active methylene compound selected from the group consisting of dialkyl malonate and alkylaceetoacetate.

9. The method according to claim 8, in which the preparation of said water-soluble blend is 1.25 to 10% by weight of said durable press finishing composition.

10. The method according to claim 9, in which the preparation of said water-soluble active methylene compound is 1.25 to 5% by weight of said durable press finishing composition when the durable press finishing composition is to be used in padding a fabric.

11. The method according to claim 9, in which the preparation of said water-soluble active methylene compound is 2.25 to 10% solids by weight of said durable press finishing composition is to be used in foam finishing a fabric.

12. The method according to claim 8, wherein the durable press composition includes an N-methylol cross-linking agent.

13. The method according to claim 8, wherein the N-methylol cross-linking agent is a DMDHEU or a modified DMDHEU resin system.

14. A method for the preparation of a durable press finishing composition comprising a water-soluble blend, said method comprising the steps of:

a) mixing together, under anhydrous conditions, a substituted or unsubstituted polyhydric alcohol and an active methylene compound selected from the group consisting of dialkyl malonate and alkylacetoacetate;

b) stirring the mixture to obtain a water-soluble blend which is an effective formaldehyde scavenger;

c) diluting the water-soluble blend; and d) incorporating the water-soluble active methylene solution into a durable press finishing composition.

15. The method according to claim 14, wherein the active methylene compound and the substituted or unsubstituted polyhydric alcohol are mixed in a ratio of 1 mole dialkyl malonate : 2.2 moles substituted or unsubstituted polyhydric alcohol.

16. The method according to claim 14, wherein the active methylene compound is diethyl malonate.

17. The method according to claim 14, wherein the active methylene compound is dimethyl malonate.

18. The method according to claim 14, wherein the active methylene compound is ethylacetoacetate.

19. The method according to claim 14, wherein the substituted or unsubstituted polyhydric alcohol is diethylene glycol.

20. The method according to claim 14, wherein the water-soluble blend is diluted to 50% solids.

21. The method according to claim 14, wherein the water-soluble blend is incorporated into the durable press finishing composition in an amount ranging from 1.25 to 10% solids owb.

22. The method according to claim 21, wherein the water-soluble blend is incorporated into the durable press finishing composition in amount ranging from 1.25 to 5.00% solids owb when the durable press finishing composition is to be used in padding a fabric.

23. The method according to claim 21, wherein the water-soluble blend is incorporated into the durable press finishing composition in amount ranging from 2.5 to 10% solids owb when the durable press finishing composition is to be used in foam finishing a fabric.

24. The method according to claim 14, wherein the durable press finishing composition further comprises an N-methylol cross-linking agent.

25. The method according to claim 24, wherein the N-methylol cross-linking agent is a DMDHEU or a modified DMDHEU resin system.

26. A fabric composed either entirely or in part of cellulosic fibers, treated with a durable press finishing composition comprising a water-soluble blend of a substituted or unsubstituted polyhydric alcohol and an active methylene compound selected from the group consisting of dialkyl malonate and alkylacetoacetate.

27. The fabric according to claim 26, wherein the durable press composition includes an N-methylol cross-linking agent.

28. The fabric according to claim 27, wherein the N-methylol cross-linking agent is a DMDHEU or a modified DMDHEU resin system.

29. The fabric according to claim 26, wherein the active methylene compound is diethyl malonate.

30. The fabric according to claim 26, wherein the active methylene compound is dimethyl malonate.

31. The fabric according to claim 26, wherein the substituted or unsubstituted polyhydric alcohol is diethylene glycol.

32. A method of manufacturing particleboard which comprises mixing a wood material with a urea-formaldehyde resin and curing by heating the resin and reducing the amount of formaldehyde released from the particleboard by adding a scavenger to the urea-formaldehyde resin;

the improvement wherein the scavenger is a water-soluble blend of a substituted or unsubstituted polyhydric alcohol and an active methylene compound selected from the group consisting of dialkyl malonate and alkylacetoacetate.

33. A method of manufacturing particleboard according to claim 32, wherein the active methylene compound is diethyl malonate.

34. A method of manufacturing particleboard according to claim 32, wherein the active methylene compound is dimethyl malonate.

35. A method of manufacturing particleboard according to claim 32, wherein the substituted or unsubstituted polyhydric alcohol is diethylene glycol.

* * * * *